UNITED STATES PATENT OFFICE.

NATHANIEL B. POWTER, OF NEW YORK, N. Y.

PROCESS OF MAKING FERTILIZERS.

SPECIFICATION forming part of Letters Patent No. 517,662, dated April 3, 1894.

Application filed April 4, 1893. Serial No. 469,046. (No specimens.)

*To all whom it may concern:*

Be it known that I, NATHANIEL B. POWTER, a subject of Her Britannic Majesty, and a resident of the city, county, and State of New York, have invented certain new and useful Improvements in Methods of Utilizing Slaughter-House Refuse and Similar Waste Products, of which the following is a specification.

Great difficulties have heretofore attended all attempts to make use of substances containing animal and vegetable refuse matter, such as slaughter house and fisheries refuse, city garbage and market waste. These difficulties have been found so great that the main attempt has been simply to get rid of such waste material, either by burning the same or by conveying the same to sea in scows and there dumping it. I have discovered a method of converting substances of this character into valuable products by entirely deodorizing them and converting them into a dry mass, which may be used for various purposes, such as fertilizers and various other purposes.

My improved method is briefly as follows: I first collect the quantity of garbage, market waste or similar substances containing organic vegetable or animal matter in a vat or other convenient receptacle and then sprinkle on the surface of this substance a quantity of substantially pure phosphate of alumina, either in the form of a dry powder or mixed with water. By substantially pure phosphate of alumina, I mean an alumina phosphate which analyzes at from about thirty to forty per cent. alumina and oxide of iron, thirty two to thirty nine per cent. $P_2O_5$ the balance being water or moisture, with from three to ten per cent. of insoluble silicates or similar impurities. Such alumina phosphates are on sale and are readily procured in the market; but I do not confine myself to a special chemical formula as limiting the use of alumina phosphate, as the presence of what may be considered impurities with regard to the use to which I put said alumina phosphate, might vary the chemical formula without altering the character of the ingredient as a substantially pure phosphate of alumina. The offensive odor given off by the decomposing waste matter disappears almost immediately upon the application of this phosphate of alumina. The quantity of this substance employed should be from an amount equivalent to about five to fifty per cent. of the waste matter to be treated. The quantity required will vary with the special constituents of the waste matter to be treated, but just enough should be used to take up the soluble and volatile substances found in the mass of refuse. After a little experience, the amount required for each batch of waste material treated will be easily recognized. As soon as the phosphate of alumina is sprinkled upon the waste material, it is to be thoroughly stirred in and then left to dry by the chemical action of the phosphate upon the organic matter contained in the mass. This drying takes several hours; and the completion of the process is recognized by the fact that the mass has assumed substantially a dry, granular condition. It is now odorless and inoffensive and may be used in any desired quantity, either for fertilizing or other purposes, as before stated.

I claim—

The above described method of utilizing slaughter house refuse and similar waste products, which consists, in mixing therewith from five to fifty per cent. of substantially pure phosphate of alumina containing insoluble phosphoric acid and allowing the mixture to dry, whereby the mass is converted into an odorless fertilizing compound of a dry character, substantially as and for the purposes specified.

N. B. POWTER.

Witnesses:
W. P. PREBLE, Jr.,
P. P. QUACKENBOSS.